(12) United States Patent
Kominami et al.

(10) Patent No.: US 11,413,936 B2
(45) Date of Patent: Aug. 16, 2022

(54) HEAT EXCHANGER HEADERS WITH BUFFER AND DAMPING MATERIALS

(71) Applicant: MITSUBISHI HEAVY INDUSTRIES THERMAL SYSTEMS, LTD., Tokyo (JP)

(72) Inventors: Satoshi Kominami, Tokyo (JP); Takahide Yamamoto, Tokyo (JP); Tsubasa Yamashita, Tokyo (JP)

(73) Assignee: MITSUBISHI HEAVY INDUSTRIES THERMAL SYSTEMS, LTD., Tokyo (JP)

( * ) Notice: Subject to any disclaimer, the term of this patent is extended or adjusted under 35 U.S.C. 154(b) by 291 days.

(21) Appl. No.: 16/349,823

(22) PCT Filed: Nov. 14, 2017

(86) PCT No.: PCT/JP2017/040906
§ 371 (c)(1),
(2) Date: May 14, 2019

(87) PCT Pub. No.: WO2018/092761
PCT Pub. Date: May 24, 2018

(65) Prior Publication Data
US 2019/0366805 A1  Dec. 5, 2019

(30) Foreign Application Priority Data
Nov. 18, 2016 (JP) .............................. JP2016-225161

(51) Int. Cl.
*B60H 1/32* (2006.01)
*F28D 1/04* (2006.01)
(Continued)

(52) U.S. Cl.
CPC ................ *B60H 1/32* (2013.01); *F28D 1/04* (2013.01); *F28F 9/013* (2013.01); *F28F 9/02* (2013.01); *F25B 39/04* (2013.01)

(58) Field of Classification Search
CPC ............ B60H 1/00521; B60H 1/00635; B60H 2001/00635; B60H 1/32; B60H 1/3233;
(Continued)

(56) References Cited

U.S. PATENT DOCUMENTS 3,123,170 A * 3/1964 Bryant ................... B60K 11/04
180/68.4
3,858,291 A * 1/1975 Perpall .................. F28F 9/0226
29/890.03
(Continued)

FOREIGN PATENT DOCUMENTS

JP  2000-2495 A   1/2000
JP  2006-273148 A  10/2006

OTHER PUBLICATIONS

Written Opinion of the International Searching Authority and International Search Report, dated Jan. 23, 2018, for corresponding international Application No. PCT/JP2017/040906, with English translations.

*Primary Examiner* — Travis Ruby
(74) *Attorney, Agent, or Firm* — Birch, Stewart, Kolasch & Birch, LLP

(57) ABSTRACT

A heat exchanger includes: a heat exchanger body which includes an adhesive lower damping material which is provided on a lower outer peripheral surface of a lower tubular member exposed from a lower buffer material provided in each of both end portions in both end portions of the lower tubular member constituting at least a lower header and is formed such that at least a portion of each of both end portions extends between the lower tubular member and the lower buffer material; and a casing which includes first and
(Continued)

second abutment portions against which the lower buffer material abuts and a condensate water discharge unit which discharges condensate water to an outside.

8 Claims, 17 Drawing Sheets

(51) Int. Cl.
    *F28F 9/013*     (2006.01)
    *F28F 9/02*     (2006.01)
    *F25B 39/04*     (2006.01)

(58) Field of Classification Search
CPC .. B60H 1/00328; F28F 9/001; F28F 2265/30; F28F 9/013; F28F 9/02; F28F 17/005; F28F 2270/00; F28F 2265/26; F28F 9/0239; F28F 9/0243; F28F 2230/00; F28F 2235/00; F28F 2240/00; F28F 2255/02; F28F 2275/025; F28D 1/05391; F28D 2021/0085; F28D 1/04; F28D 1/053; B60K 11/04; F25B 39/04
See application file for complete search history.

(56) References Cited

U.S. PATENT DOCUMENTS

| | | | | |
|---|---|---|---|---|
| 4,196,774 A * | 4/1980 | Hoffmann | ............... | B60K 11/04 165/149 |
| 4,315,540 A * | 2/1982 | Moranne | ............... | B60K 11/04 165/149 |
| 4,643,249 A * | 2/1987 | Grawey | ............... | F28F 9/0219 165/159 |
| 4,914,929 A * | 4/1990 | Shimazaki | ......... | B60H 1/00521 165/69 |
| 5,853,323 A * | 12/1998 | Beck | ............... | B60H 1/00671 454/156 |
| 5,927,382 A * | 7/1999 | Kokubo | ............ | B60H 1/00978 165/42 |
| 6,019,162 A * | 2/2000 | Saida | ............... | B60H 1/00521 165/42 |
| 6,364,007 B1 * | 4/2002 | Fischer | ............... | F28D 9/0037 165/166 |
| 6,772,824 B1 * | 8/2004 | Tsuruta | ............... | B60K 11/02 123/41.49 |
| 2003/0006033 A1 * | 1/2003 | Kawada | ............ | B60H 1/00521 165/202 |
| 2003/0051497 A1 * | 3/2003 | Nomura | ............... | F28F 9/002 62/239 |
| 2009/0120610 A1 * | 5/2009 | Coyle | ............... | F28F 9/002 165/67 |
| 2012/0132396 A1 * | 5/2012 | Komatsubara | ...... | F28D 1/05391 165/67 |
| 2014/0020425 A1 * | 1/2014 | Hirayama | ............ | F28F 9/0224 62/515 |
| 2015/0083091 A1 * | 3/2015 | Fehrenbach | ......... | F28D 7/1692 123/542 |
| 2015/0159961 A1 * | 6/2015 | Berndt | ............... | F28F 1/00 165/173 |
| 2016/0010924 A1 * | 1/2016 | Samoto | ............... | F28D 1/05391 165/173 |
| 2018/0126822 A1 * | 5/2018 | Nishino | ............... | F28F 9/02 |

\* cited by examiner

HEAT EXCHANGER HEADERS WITH BUFFER AND DAMPING MATERIALS

TECHNICAL FIELD

The present invention relates to a heat exchanger.

Priority is claimed on Japanese Patent Application No. 2016-225161, filed on Nov. 18, 2016, the content of which is incorporated herein by reference.

BACKGROUND ART

A vehicle air conditioner has a heat exchanger which includes a casing and a heat exchanger body including a plurality of tubes which are accommodated in the casing and through which a refrigerant flows, and fins which are disposed between the tubes.

In the heat exchanger, air-conditioning air introduced in the casing and the refrigerant flowing through the tubes of the heat exchanger body are heat-exchanged with each other, and thus, the air-conditioning air is cooled.

In this case, condensate water is generated on a surface of the heat exchanger body. The condensate water flows a lower end side of the heat exchanger body along the surface of the heat exchanger body.

In the heat exchanger configured as described above, if the heat exchanger body is formed of a metal material, the heat exchanger body vibrates due to a flow of the refrigerant in the tubes, and thus, there is a possibility that noise is generated.

Patent Document 1 discloses that the heat exchanger body is provided with a damping material for a purpose of suppressing noise generated from a heat exchanger body.

CITATION LIST

Patent Literature

Patent Document 1: Japanese Unexamined Patent Application, First Publication No. 2000-2495

SUMMARY OF INVENTION

Technical Problem

As the damping material, a damping material having adhesion may be used. In a case where the damping material is used, an adhesive force between the damping material and the heat exchanger body decreases due to the above-mentioned condensate water or aging, and thus, the damping material may be peeled off from the heat exchanger body.

Accordingly, an object of the present invention is to provide a heat exchanger capable of preventing the damping material from being peeled off from the heat exchanger body.

Solution to Problem

In order to solve the problem, according to an aspect of the present invention, there is provided a heat exchanger including: a heat exchanger body which includes a tubular upper header and a tubular lower header which are provided with a gap therebetween in an upward-downward direction, a plurality of tubes which are arranged between the upper header and the lower header and are connected to the upper header and the lower header, and through which a refrigerant flows, fins which are provided between the tubes provided at positions adjacent to each other, a lower buffer material which is provided to cover a lower outer peripheral surface of each of both end portions of the lower header, and an adhesive lower damping material which is provided on the lower outer peripheral surface of the lower header exposed from the lower buffer material provided in each of both end portions of the lower header and is formed such that at least a portion of each of both end portions extends between the lower header and the lower buffer material; and a casing which includes a first abutment portion against which one of the lower buffer materials provided in both end portions of the lower header abuts, a second abutment portion against which the other thereof abuts, and a condensate water discharge unit which is provided below the first and second abutment portions and discharges condensate water attached to the heat exchanger body to an outside.

According to the present invention, at least a portion of each of both end portions of the lower damping material is disposed to extend between the lower header and the lower buffer material, and it is possible to support a portion of each of both end portions of the lower damping material using the lower buffer materials supported by the first and second abutment portions.

Accordingly, even in a case where an adhesive force of the lower damping material is decreased due to the condensate water flowing to a lower end side of the heat exchanger body along a surface of the heat exchanger body, aging of the lower damping material, or the like, it is possible to prevent the lower damping material from being peeled off from the heat exchanger body (lower header).

Moreover, in the heat exchanger according to the aspect of the present invention, the lower header may include a pair of lower tubular members which is disposed to be adjacent to each other and extends in the same direction, the lower damping material may be provided in at least a portion of each of both end portions of the pair of lower tubular members, and the lower buffer material may be disposed to collectively surround the lower damping materials provided in each of both end portions of the pair of lower tubular members.

In this way, the lower buffer materials are disposed to collectively surround the lower damping materials provided in each of both end portions of the pair of lower tubular members, and thus, compared to a case where the lower buffer material is disposed to surround each lower damping material provided in the pair of lower tubular members, it is possible to decrease a use of the lower buffer material. Accordingly, it is possible to reduce a cost of the heat exchanger body.

Moreover, in the heat exchanger according to the aspect of the present invention, the lower header may include a pair of lower tubular members which is disposed to be adjacent to each other and extends in the same direction, the lower damping material may be provided in at least a portion of each of both end portions of the pair of lower tubular members, the lower buffer material may be disposed to collectively surround an entirety of the lower damping materials provided in the pair of lower tubular members, and a through-portion may be provided in the lower buffer material disposed between the pair of lower tubular members.

In this way, the lower buffer material is disposed to collectively surround the entirety of the lower damping materials provided in the pair of lower tubular members, and thus, it is possible to support the lower damping material provided between both end portions of the pair of lower tubular members. Accordingly, it is possible to further prevent the lower damping material from being peeled off from the heat exchanger body (the lower header).

Moreover, compared to a case where the lower buffer material is disposed to surround each lower damping material provided in the pair of lower tubular members, it is possible to decrease the amount of the lower buffer material. Accordingly, it is possible to reduce a cost of the heat exchanger body.

In addition, the through-portion is provided in the lower buffer material disposed between the pair of lower tubular members, and thus, it is possible to guide the condensate water to the condensate water discharge unit. Therefore, it is possible to prevent the condensate water from being collected in the lower end of the heat exchanger body.

In addition, in the heat exchanger according to the aspect of the present invention, the lower header may include a pair of lower tubular members which is disposed to be adjacent to each other and extends in the same direction, the lower damping material may include a first adhesive lower damping material which is provided in one lower tubular member of the pair of lower tubular members and a second adhesive lower damping material which is provided in the other lower tubular member of the pair of lower tubular members, and in a case where an area of an adhesive surface of the first lower damping material being in contact with one lower tubular member is smaller than an area of an adhesive surface of the second lower damping material being in contact with the other lower tubular member, the lower buffer material and only both end portions of the first lower damping material may overlap each other.

In this way, in a case where the area of the adhesive surface of the first lower damping material is smaller than the area of the adhesive surface of the second lower damping material and the adhesive force of the first lower damping material with respect to one lower tubular member is weak, the lower buffer materials and only both end portions of the first lower damping material overlap each other, and thus, it is possible to prevent the first lower damping material from being peeled off.

In a case where the adhesive force of the second lower damping material with respect to the other lower tubular member is sufficiently strong, the lower buffer materials and both end portions of the second lower damping materials may not overlap each other.

Moreover, in the heat exchanger according to the aspect of the present invention, the heat exchanger body may include an upper buffer material which is provided to cover an upper outer peripheral surface of each of both end portions of the upper header, and an adhesive upper damping material which is provided on the upper outer peripheral surface of the upper header exposed from the upper buffer material provided in each of both end portions of the upper header and is formed such that at least a portion of each of both end portions extends between the upper header and the upper buffer material, and the casing may include a third abutment portion against which one of the upper buffer materials provided in both end portions of the upper header abuts and a fourth abutment portion against which the other thereof abuts.

In this way, at least a portion of each of both end portions of the upper damping material is disposed to extend between the upper header and the upper buffer material, and thus, it is possible to support a portion of each of both end portions of the upper damping material using the upper buffer materials supported by the third and fourth abutment portions.

Accordingly, even in a case where an adhesive force of the upper damping material is decreased due to the condensate water generated on the surface of the heat exchanger body, aging of the upper damping material, or the like, it is possible to prevent the upper damping material from being peeled off from the heat exchanger body (upper header).

In addition, in the heat exchanger according to the aspect of the present invention, the upper header may include a pair of upper tubular members which is disposed to be adjacent to each other and extends in the same direction, the upper damping material may be provided in a portion of each of both end portions of at least the pair of upper tubular members, and the upper buffer material may be disposed to collectively surround the upper damping materials provided in each of both end portions of the pair of upper tubular members.

In this way, the upper buffer materials are disposed to collectively surround the upper damping materials provided in each of both end portions of the pair of upper tubular members, and thus, compared to a case where the upper buffer material is disposed to surround each upper damping material provided in the pair of upper tubular members, it is possible to decrease an amount of a use of the upper buffer material, and thus, it is possible to reduce the cost of the heat exchanger body.

Moreover, in the heat exchanger according to the aspect of the present invention, the upper header may include a pair of upper tubular members which is disposed to be adjacent to each other and extends in the same direction, the upper damping material may be provided in a portion of each of both end portions of at least the pair of upper tubular members, and the upper buffer material may be disposed to collectively surround an entirety of the upper damping materials provided in the pair of upper tubular members.

In this way, the upper buffer material is disposed to collectively surround the entirety of the upper damping materials provided in the pair of upper tubular members, and thus, it is possible to support the upper damping material provided between both end portions of the pair of upper tubular members. Accordingly, it is possible to further prevent the upper damping material from being peeled off from the heat exchanger body.

Advantageous Effects of Invention

According to the present invention, it is possible to prevent a damping material from being peeled off from the heat exchanger body.

DESCRIPTION OF EMBODIMENTS

Hereinafter, embodiments to which the present invention is applied will be described in detail with reference to the drawings.

First Embodiment

Figure 1:
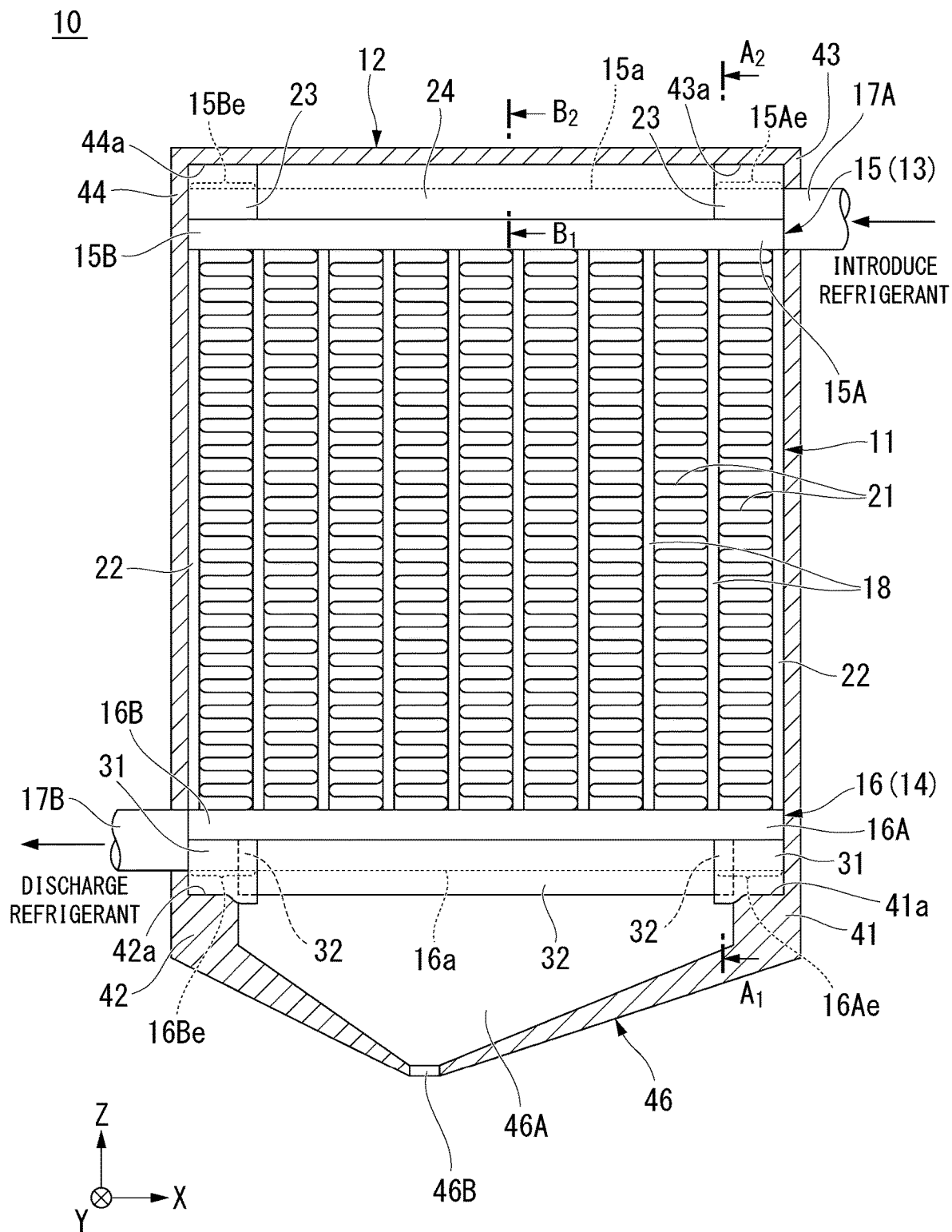
FIG. 1 is a front view schematically showing a heat exchanger according to a first embodiment of the present invention.
Figure 2:
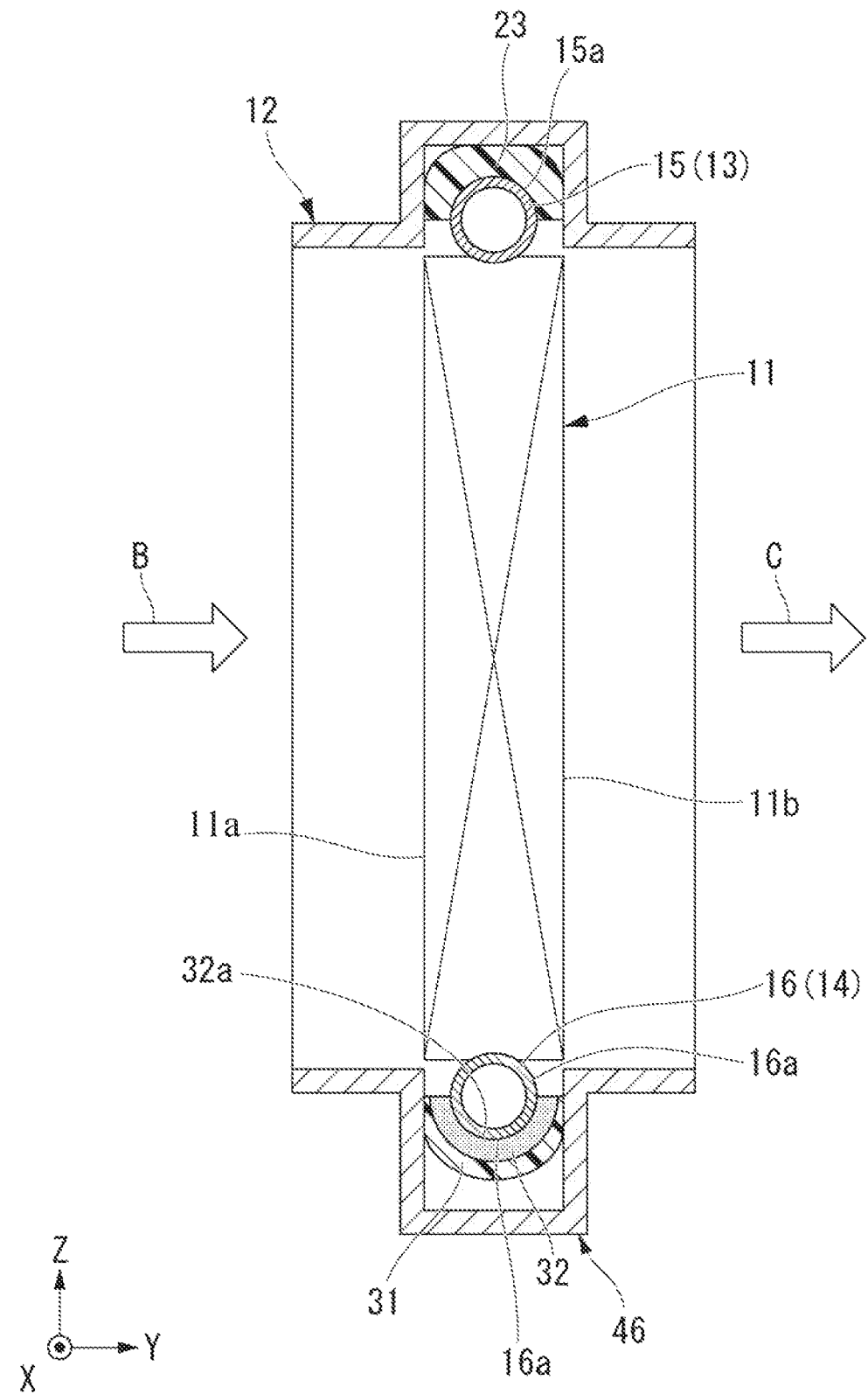
FIG. 2 is a sectional view taken along line $A_1$-$A_2$ in the heat exchanger shown in FIG. 1.
Figure 3:
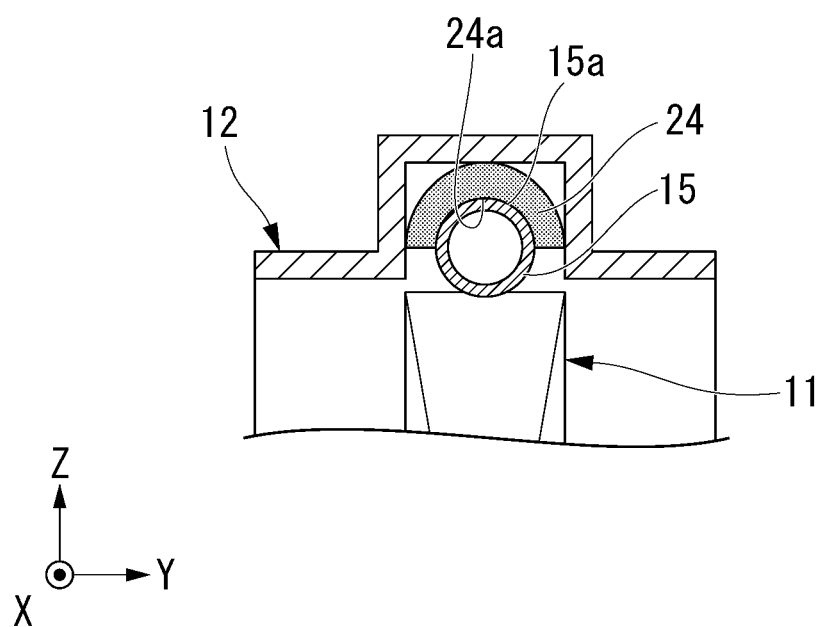
FIG. 3 is a sectional view taken along line $B_1$-$B_2$ in the heat exchanger shown in FIG. 1.

A heat exchanger 10 of a first embodiment of the present invention will be described with reference to FIGS. 1 to 3. In FIGS. 1 to 3, an X direction indicates a width direction of a heat exchanger body 11, a Y direction indicates a depth direction of the heat exchanger body 11 orthogonal to the X direction, and a Z direction indicates a vertical direction (upward-downward direction) orthogonal to an XY plane.

In FIG. 1, for convenience of explanation, a casing 12 is shown in cross section. In FIG. 2, B indicates a movement direction (hereinafter, referred to as a "B direction") of an outside air (air-conditioning air) supplied to a front surface 11a side of the heat exchanger body 11, and C indicates a direction (hereinafter, referred to as a "C direction") in which the air-conditioning air subjected to heat exchange moves.

In addition, in FIGS. 2 and 3, in the heat exchanger body 11, a portion disposed between an upper header 13 and a lower header 14 is shown to be simplified.

The heat exchanger 10 has the heat exchanger body 11 and the casing 12. The heat exchanger body 11 has the upper header 13, the lower header 14, a plurality of tubes 18, a plurality of fins 21, a pair of side plates 22, an upper buffer material 23, an upper damping material 24, a lower buffer material 31, and a lower damping material 32.

The upper header 13 constitutes an upper end portion of the heat exchanger body 11. The upper header 13 includes one upper tubular member 15. The upper tubular member 15 is disposed to extend in the X direction. The upper tubular member 15 is connected to upper ends of the plurality of tubes 18.

The upper tubular member 15 has an outer peripheral surface 15a, one end 15A, an end portion 15Ae which includes the one end 15A, the other end 15B, and an end portion 15Be which includes the other end 15B.

The outer peripheral surface 15a is a surface on which the upper buffer material 23 and the upper damping material 24 are provided.

The one end 15A is an open end and the other end 15B is a closed end. The one end 15A is connected to a refrigerant inlet tube 17A. A refrigerant flowing through the refrigerant inlet tube 17A is supplied to the one end 15A of the upper tubular member 15. The refrigerant is distributed into the plurality of tubes 18 by the upper tubular member 15.

The end portions 15Ae and 15Be are portions in which the upper buffer materials 23 are provided. The end portions 15Ae and 15Be are supported by the casing 12 via the upper buffer materials 23.

In addition, in the following descriptions, both end portions (both end portions of the upper header 13) of the upper tubular member 15 may be described as "both end portions 15Ae and 15Be".

The lower header 14 constitutes a lower end portion of the heat exchanger body 11. The lower header 14 is provided to face the upper header 13 in a state of being separated from the upper header 13 below the upper header 13. That is, the upper header 13 and the lower header 14 are provided with a gap therebetween in the Z direction (upward-downward direction).

The lower header 14 includes one lower tubular member 16. The lower tubular member 16 is disposed to extend in the X direction. The lower tubular member 16 is connected to lower ends of the plurality of tubes 18.

The lower tubular member 16 has an outer peripheral surface 16a, one end 16A, an end portion 16Ae which includes the one end 16A, the other end 16B, and an end portion 16Be which includes the other end 16B.

The outer peripheral surface 16a is a surface on which the lower buffer material 31 and the lower damping material 32 are provided.

The one end 16A is a closed end and the other end 16B is an open end. The other end 16B is connected to a refrigerant outlet tube 17B. The refrigerant, which passes through the plurality of tubes 18 and is subjected to the heat exchange with the air-conditioning air, is discharged to the refrigerant outlet tube 17B through the other end 16B of the lower tubular member 16.

The end portions 16Ae and 16Be are portions (portions corresponding to lower buffer material formation regions) in which the lower buffer materials 31 are provided. The end portions 16Ae and 16Be are supported by the casing 12 via the lower buffer materials 31.

In addition, in the following descriptions, both end portions (both end portions of the lower header 14) of the lower tubular member 16 may be described as "both end portions 16Ae and 16Be".

For example, as a material of each of the above-described upper header 13 and the lower header 14, aluminum, an aluminum alloy, or the like can be used.

The plurality of tubes 18 are provided between the upper header 13 and the lower header 14. The plurality of tubes 18 extend in the Z direction and are connected to the upper header 13 and the lower header 14. The plurality of tubes 18 are arranged in the X direction at predetermined gaps.

The refrigerant flows through the plurality of tubes 18. The refrigerant flowing through the plurality of tubes 18 is heat-exchanged with the air-conditioning air supplied to the front surface 11a of the heat exchanger body 11 in the B direction. The air-conditioning air subjected to the heat exchange passes through a rear surface 11b of the heat exchanger body 11 and flows in the C direction.

During the heat exchange, condensate water is generated on a surface of the heat exchanger body 11. The condensate water moves a lower end side of the heat exchanger body 11 along the surface of the heat exchanger body 11.

The plurality of fins 21 are provided between the plurality of tubes 18 (between the tubes 18 provided at positions adjacent to each other).

The pair of side plates 22 is provided such that a structure including the plurality of tubes and the plurality of fins 21 is interposed between the side plates in the X direction. Upper ends of the pair of side plates 22 are connected to the upper tubular member 15 (upper header 13) and lower ends thereof are connected to the lower tubular member 16 (lower header 14).

For example, as a material of each of the plurality of tubes 18, the plurality of fins 21, and the pair of side plates 22, aluminum, an aluminum alloy, or the like can be used.

The upper buffer material 23 is provided so as to cover the upper outer peripheral surfaces 15a of each of both end portions 15Ae and 15Be of the upper tubular member 15. For example, a foam material can be used as the upper buffer material 23.

The upper buffer material 23 has a function to insulate heat between a structure of the heat exchanger body 11 excluding the upper buffer material 23 and the casing 12 and a function to absorb a dimensional tolerance between the structure of the heat exchanger body 11 excluding the upper buffer material 23 and the casing 12.

The upper damping material 24 is provided to cover the upper outer peripheral surface 15a of the upper tubular member 15 positioned between both end portions 15Ae and 15Be. The upper damping material 24 is a damping material having adhesion. The upper damping material 24 has an adhesive surface 24a which is in contact with the outer peripheral surface 15a.

The upper damping material 24 is provided so as not overlap the upper buffer material 23 (in other words, so as not to be disposed between the upper tubular member 15 and the upper buffer material 23).

The upper damping material 24 has a function of reducing noise generated from the heat exchanger body 11 by damping vibrations of the heat exchanger body 11.

For example, as the upper damping material 24, a material which includes a butyl rubber as a main component and contains an adhesive can be used.

The lower buffer material 31 is provided to cover the lower outer peripheral surface 16a of each of both end portions 16Ae and 16Be of the lower tubular member 16. A portion of each of two lower buffer materials 31 is exposed to a condensate water discharge space 46A described later.

The lower buffer material 31 has a function to insulate heat between a structure of the heat exchanger body 11 excluding the lower buffer material 31 and the casing 12 and a function to absorb a dimensional tolerance between the structure of the heat exchanger body 11 excluding the lower buffer material 31 and the casing 12.

For example, a foam material can be used as the lower buffer material 31.

The lower damping material 32 is provided to cover the lower outer peripheral surface 16a of the lower tubular member 16 positioned between both end portions 16Ae and 16Be. The lower damping material 32 is a damping material having adhesion.

The lower damping material 32 has an adhesive surface 32a which is in contact with the outer peripheral surface 16a.

A portion of each of both end portions of the lower damping material 32 is provided to extend toward a portion of each of both end portions 16Ae and 16Be of the lower tubular member 16. That is, a portion of the lower damping material 32 is disposed on the lower outer peripheral surface 16a of each of both end portions 16Ae and 16Be.

Accordingly, in the lower damping material 32, a portion which is provided to extend toward a portion of the lower outer peripheral surface 16a of each of both end portions 16Ae and 16Be of the lower tubular member 16 is disposed between the end portion (the end portion 16Ae or the end portion 16Be) of the lower tubular member 16 and the lower buffer material 31.

For example, as the lower damping material 32, a material which includes a butyl rubber as a main component and contains an adhesive can be used.

The casing 12 has a shape which can be in contact with an upper end and a lower end of the heat exchanger body 11 and a pair of side surfaces of the heat exchanger body 11 disposed in the X direction. The heat exchanger body 11 is accommodated in the casing 12. In ends of the casing 12, ends facing the front surface 11a and the rear surface 11b of the heat exchanger body 11 become open ends.

The casing 12 has a first abutment portion 41, a second abutment portion 42, a third abutment portion 43, a fourth abutment portion 44, and a condensate water discharge unit 46.

The first abutment portion 41 has a shape which can accommodate a portion of the lower buffer material 31 provided in the end portion 16Ae of the lower header 14. The first abutment portion 41 has a lower surface of the lower buffer material 31 provided in the end portion 16Ae and an abutment surface 41a against which a pair of side surfaces disposed in the Y direction abuts. The first abutment portion 41 restricts a position of one lower corner of a pair of lower corners of the heat exchanger body 11.

The second abutment portion 42 has a shape which can accommodate a portion of the lower buffer material 31 provided in the end portion 16Be of the lower tubular member 16.

The second abutment portion 42 has a lower surface of the lower buffer material 31 provided in the end portion 16Be and an abutment surface 42a against which a pair of side surfaces disposed in the Y direction abuts. The second abutment portion 42 restricts a position of one lower corner of the pair of lower corners of the heat exchanger body 11.

The above-described first and second abutment portions 41 and 42 support a lower end of the heat exchanger body 11.

The third abutment portion 43 has a shape which can accommodate a portion of the upper buffer material 23 provided in the end portion 15Ae of the upper tubular member 15. The third abutment portion 43 has an upper surface of the upper buffer material 23 provided in the end portion 15Ae and an abutment surface 43a against which a pair of side surfaces disposed in the Y direction abuts. The third abutment portion 43 restricts a position of one upper corner of the pair of upper corners of the heat exchanger body 11.

The fourth abutment portion 44 has a shape which can accommodate a portion of the upper buffer material 23 provided in the end portion 15Be of the upper tubular member 15. The fourth abutment portion 44 has the upper surface of the upper buffer material 23 provided in the end portion 15Be and an abutment surface 44a against which the pair of side surfaces disposed in the Y direction abuts. The fourth abutment portion 44 restricts a position of the other upper corner of the pair of upper corners of the heat exchanger body 11.

The condensate water discharge unit 46 is provided below the first and second abutment portions 41 and 42. The condensate water discharge unit 46 has a condensate water discharge space 46A and a discharge port 46B.

The condensate water discharge space 46A exposes a portion of each of the two lower buffer materials 31 and the lower damping material 32 disposed between the two lower buffer materials 31. The condensate water discharge space 46A has a shape whose width is narrowed from the heat exchanger body 11 toward the lower side of the heat exchanger body 11.

The condensate water which moves to the lower damping material 32 is dripped to the condensate water discharge space 46A.

The discharge port 46B is provided in a lower end of the condensate water discharge unit 46. The discharge port 46B is an opening portion which discharges the condensate water to the outside of the heat exchanger 10.

According to the heat exchanger 10 of the first embodiment, a portion of each of both end portions of the lower damping material 32 is disposed to extend between the lower header 14 (lower tubular member 16) and the lower buffer material 31, and it is possible to support a portion of each of both end portions of the lower damping material 32 using the lower buffer materials 31 supported by the first and second abutment portions 41 and 42.

Accordingly, even in a case where an adhesive force of the lower damping material 32 is decreased due to the condensate water flowing to the lower end side of the heat exchanger body 11 along the surface of the heat exchanger body 11, aging of the lower damping material 32, or the like, it is possible to prevent the lower damping material 32 from being peeled off from the heat exchanger body 11.

Figure 4:
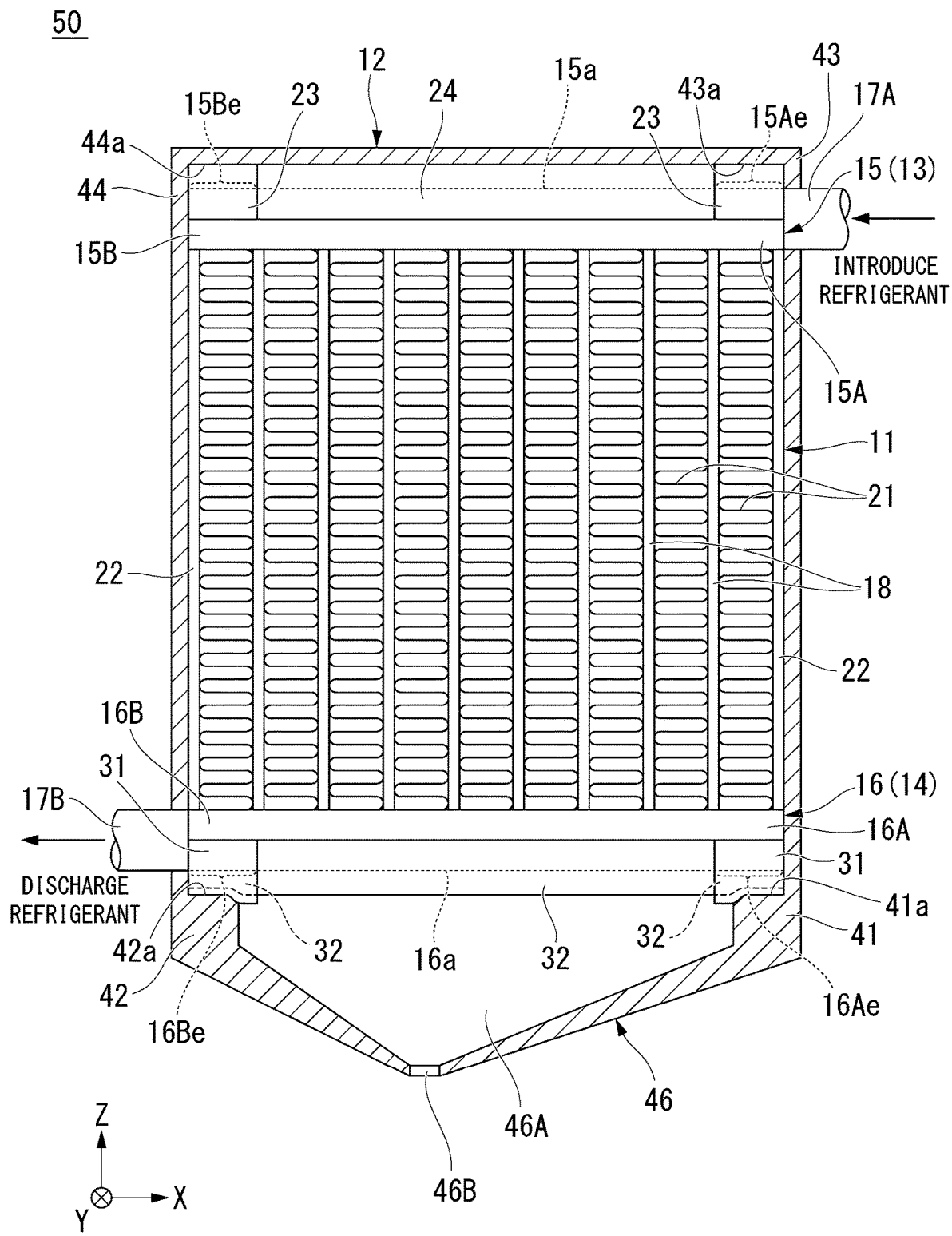
FIG. 4 is a front view schematically showing a heat exchanger according to a first modified example of the first embodiment of the present invention.

A heat exchanger 50 according to a first modified example of the first embodiment will be described with reference to FIG. 4. In FIG. 4, the same reference signs are assigned to the structure and the same portions shown in FIG. 1.

The heat exchanger 50 is configured similarly to the heat exchanger 10 of the first embodiment except that the lower damping material 32 is provided on the entire lower outer peripheral surface 16a of each of the end portions 16Ae and 16Be of the lower tubular member 16.

In the heat exchanger 50 of the first modified example of the first embodiment configured as described above, it is possible to obtain effects similar to those of the heat exchanger 10 of the above-described first embodiment.

Figure 5:
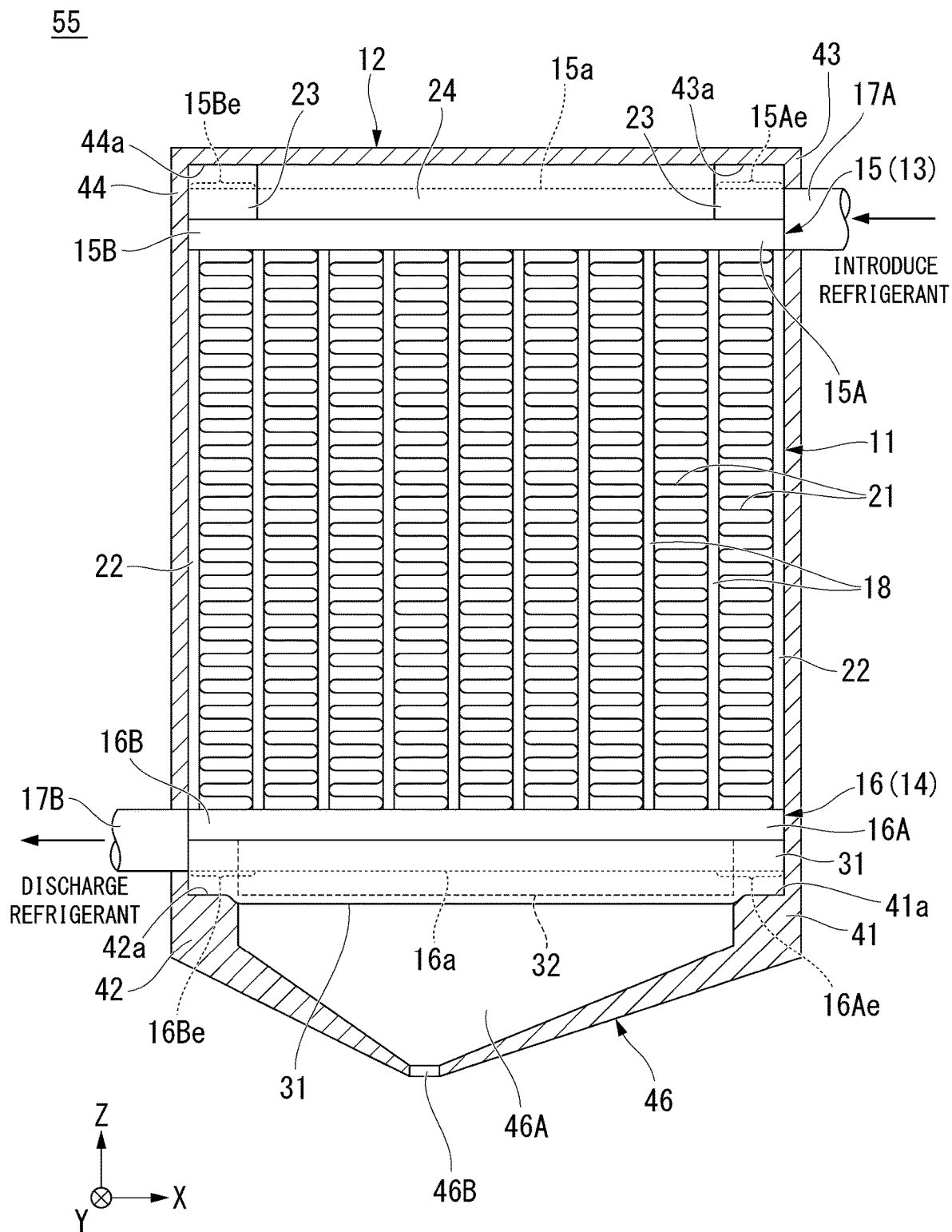
FIG. 5 is a front view schematically showing a heat exchanger according to a second modified example of the first embodiment of the present invention.

A heat exchanger 55 according to a second modified example of the first embodiment will be described with reference to FIG. 5. In FIG. 5, the same reference signs are assigned to the structure and the same portions shown in FIG. 1.

The heat exchanger 55 is configured similarly to the heat exchanger 10 of the first embodiment except that the lower buffer material 31 is provided to cover the lower damping material 32 provided between the first abutment portion 41 and the second abutment portion 42.

According to the heat exchanger 55 according to the second modified example of the first embodiment, the lower buffer material 31 is provided to cover the entire lower damping material 32, and thus, it is possible to support the entire lower damping material 32 by the lower buffer material 31. Therefore, even in a case where the adhesive force of the lower damping material 32 decreases, it is possible to further prevent the lower damping material 32 from being peeled off from the heat exchanger body 11.

Figure 6:
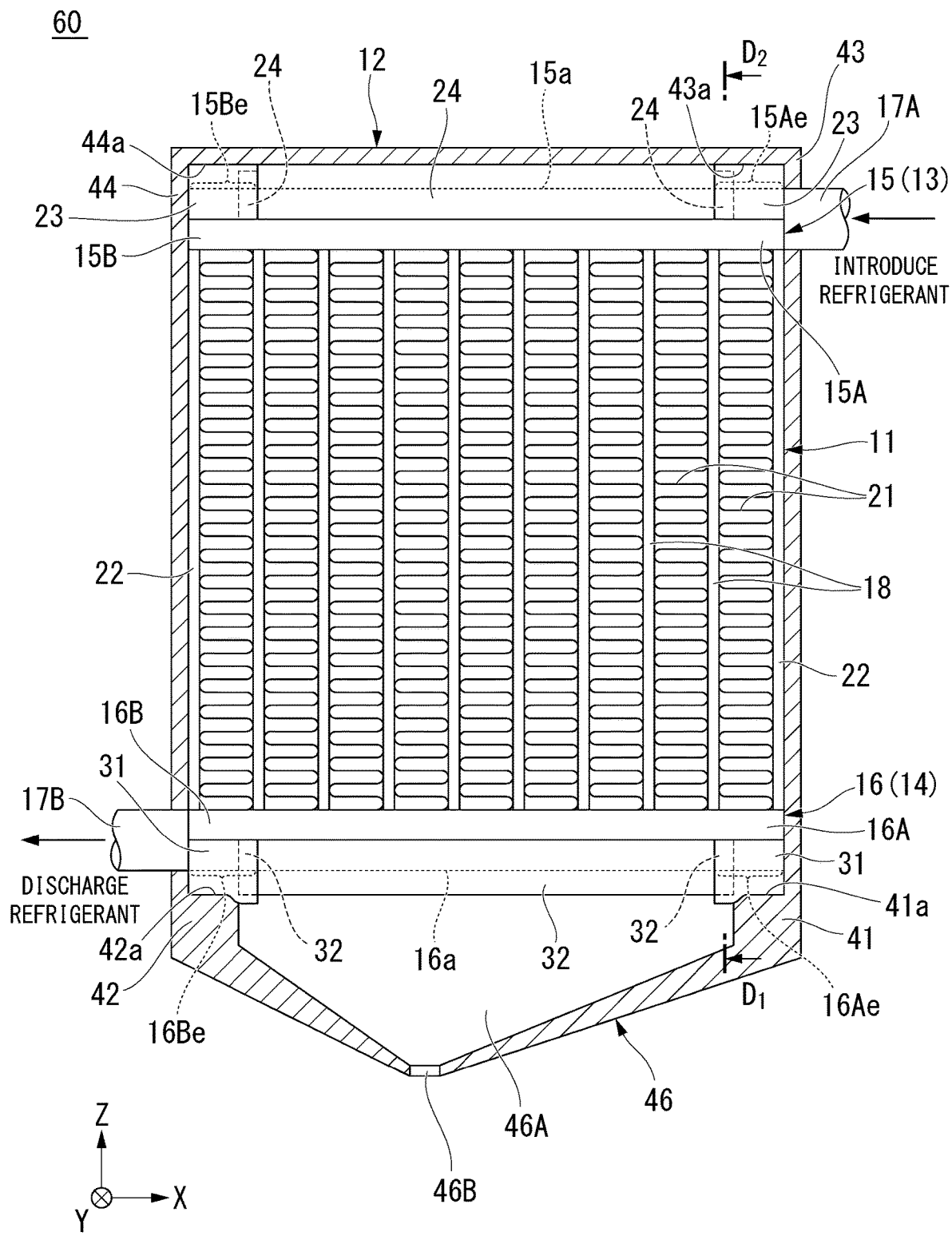
FIG. 6 is a front view schematically showing a heat exchanger according to a third modified example of the first embodiment of the present invention.
Figure 7:
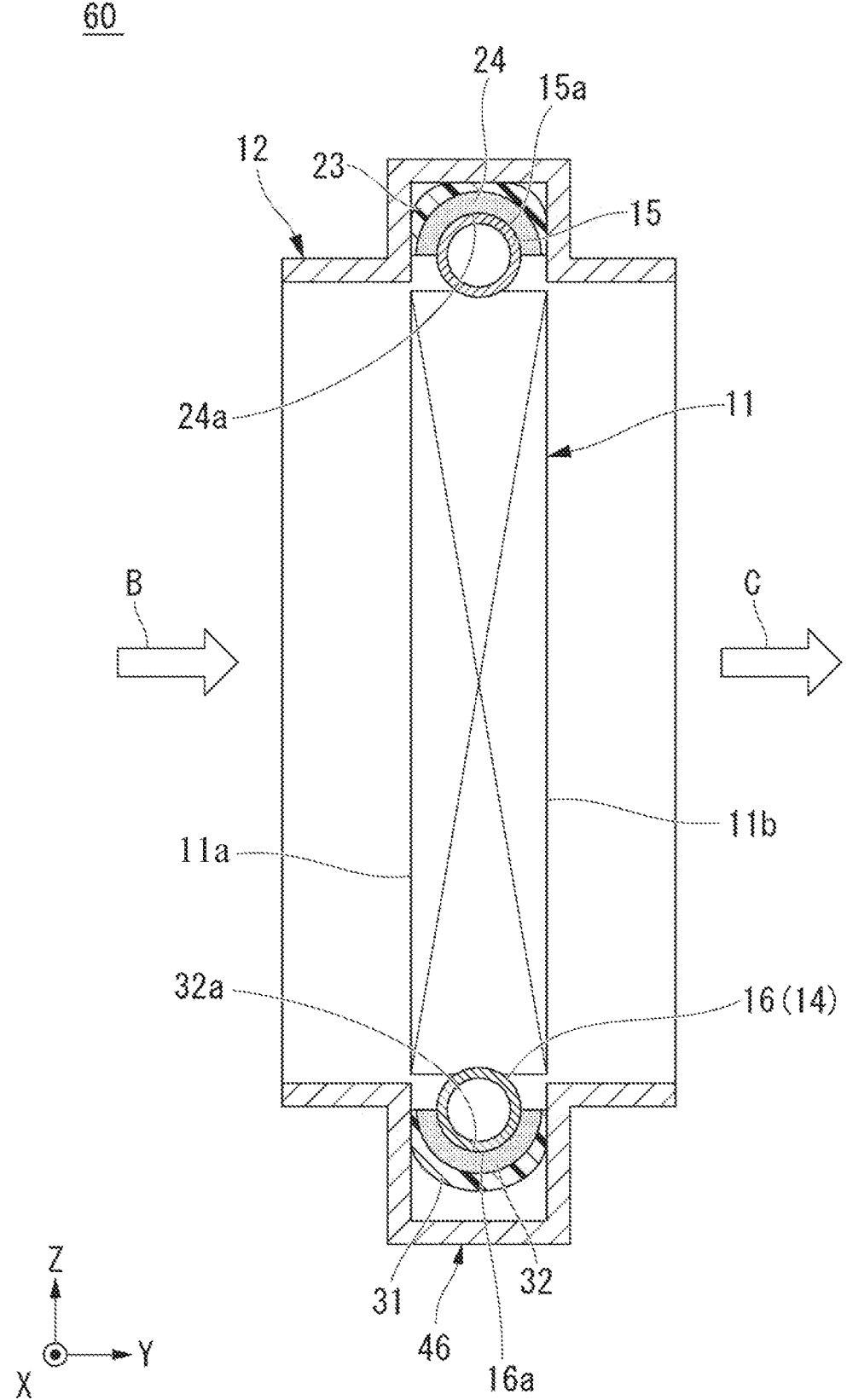
FIG. 7 is a sectional view taken along line $D_1$-$D_2$ in the heat exchanger shown in FIG. 6.

A heat exchanger 60 according to a third modified example of the first embodiment will be described with reference to FIGS. 6 and 7. In FIGS. 6 and 7, the same reference signs are assigned to the structures and the same portions shown in FIGS. 1 to 3.

The heat exchanger 60 is configured similarly to the heat exchanger 10 of the first embodiment except that a portion of each of both end portions of the upper damping material 24 is disposed to extend between the upper header 13 and the upper buffer material 23.

According to the heat exchanger 60 of the third modified example of the first embodiment, a portion of each of both end portions of the upper damping material 24 is disposed to extend between the upper header 13 (upper tubular member 15) and the upper buffer material 23, and thus, it is possible to restrict a position of a portion of each of both end portions of the upper damping material 24 using the upper buffer materials 23 supported by the third and fourth abutment portions 43 and 44.

Therefore, even in a case where the adhesive force of the upper damping material 24 decreases, it is possible to further prevent the upper damping material 24 from being peeled off from the heat exchanger body 11.

In the heat exchanger 60 of the third modified example of the first embodiment, it is possible to obtain effects similar to those of the heat exchanger 10 of the above-described first embodiment.

In addition, in the first embodiment, for example, the case is described in which U-shaped recessed portions are respectively provided on the upper side and the lower side of the casing 12, the upper end portion of the heat exchanger body 11 is accommodated in one recessed portion, and the lower end portion of the heat exchanger body 11 is accommodated in the other recessed portion. However, the casing 12 does not necessarily have the above-described recessed portions.

Specifically, for example, the shape of the casing 12 may have a shape in which one surface of a pair of surfaces of the upper buffer material 23 disposed in the Y direction, one surface of a pair of surfaces of the lower buffer material 31 disposed in the Y direction, an upper end surface of the upper buffer material 23, and a lower end surface of the lower buffer material 31 can come in contact with each other.

Alternatively, for example, the shape of the casing 12 may have a shape in which the upper end surface of the upper buffer material 23 and the lower end surface of the lower buffer material 31 can come in contact with each other.

Second Embodiment

Figure 8:
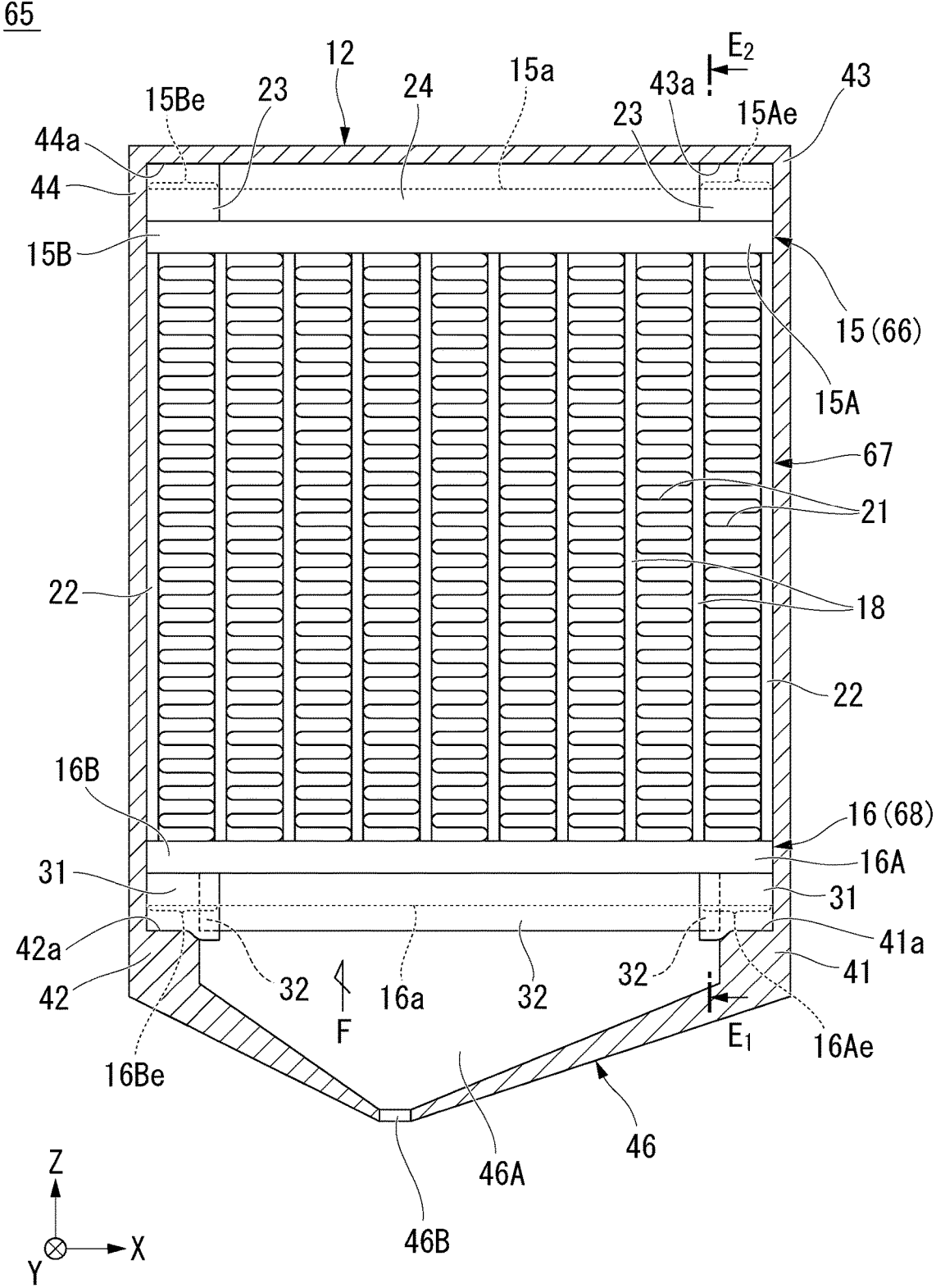
FIG. 8 is a front view schematically showing a heat exchanger according to a second embodiment of the present invention.
Figure 9:
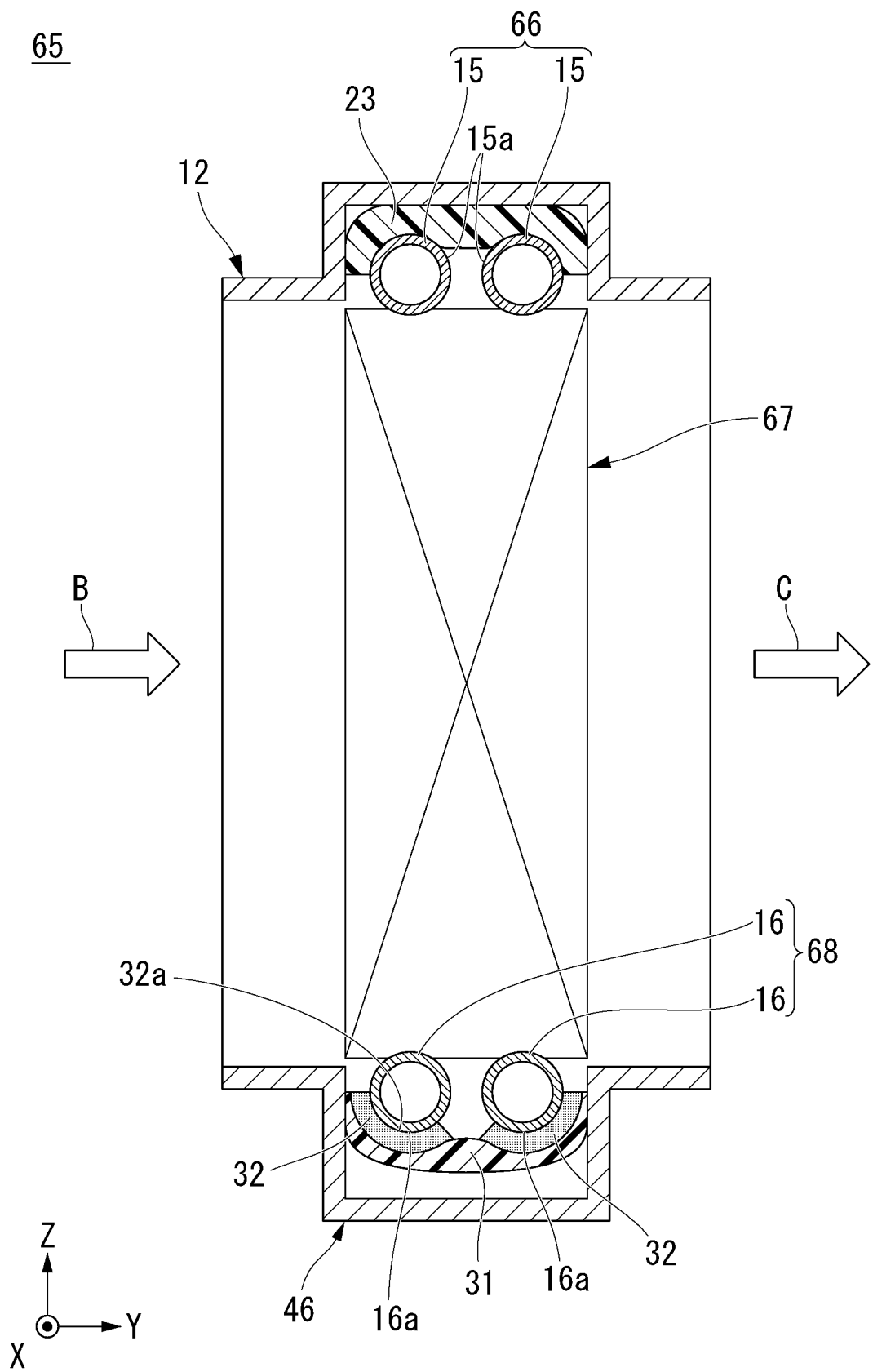
FIG. 9 is a sectional view taken along line $E_1$-$E_2$ in the heat exchanger shown in FIG. 8.
Figure 10:
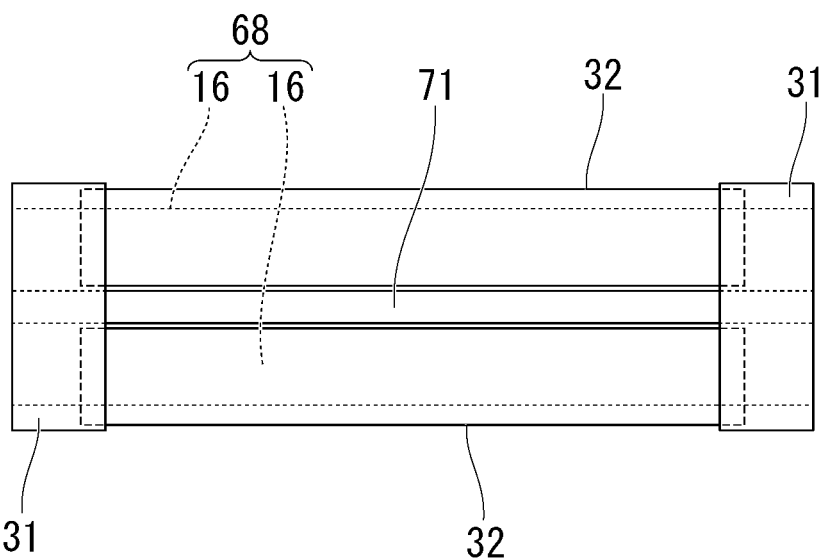
FIG. 10 is a view when a heat exchanger body in a state where a casing is removed from the heat exchanger shown in FIG. 8 is viewed from arrow F.
Figure 10:
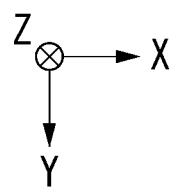

A heat exchanger 65 of a second embodiment will be described with reference to FIGS. 8 to 11. In FIG. 8, the refrigerant inlet tube 17A and the refrigerant outlet tube 17B shown in FIG. 1 are not shown. In FIGS. 8 to 11, the same reference signs are assigned to the structures and the same portions shown in FIGS. 1 to 3.

The heat exchanger 65 is configured similarly to the heat exchanger 10 except that a heat exchanger body 67 having an upper header 66 and a lower header 68 instead of the upper header 13 and the lower header 14 constituting the heat exchanger body 11 described in the first embodiment is provided.

The upper header 66 is configured similarly to the upper header 13 except that two upper tubular members 15 (having a pair of upper tubular members 15) described in the first embodiment are provided.

The pair of upper tubular members 15 are disposed with a gap therebetween in the Y direction. The pair of upper tubular members 15 extends in the X direction (the same direction).

The upper buffer materials 23 are provided in the end portions 15Ae and 15Be of each upper tubular member 15. In each upper tubular member 15, the upper damping material 24 is provided between the end portion 15Ae and the end portion 15Be.

The lower header 68 is configured similarly to the lower header 14 except that two lower tubular members 16 (having a pair of lower tubular members 16) described in the first embodiment are provided.

The pair of lower tubular members 16 are disposed with a gap therebetween in the Y direction. The pair of lower tubular members 16 extends in the X direction (the same direction).

A portion of each of both end portions of the lower damping material 32 extends to each of the end portions 16Ae and 16Be of each lower tubular member 16. The lower damping material 32 is provided in each lower tubular member 16 in a state where a gap 71 through which the condensate water can move to the condensate water discharge space 46A can be formed between the two lower tubular members 16.

In the end portions 16Ae and 16Be of the pair of lower tubular members 16, the lower buffer materials 31 are provided to collectively surround a portion of both end portions of the lower damping materials 32.

In this way, the lower buffer materials 31 are disposed to collectively surround the lower damping materials 32 provided in each of both end portions 16Ae and 16Be of the pair of lower tubular members 16, and thus, compared to a case where the lower buffer material 31 is disposed to surround each lower damping material provided in the pair of lower tubular members, it is possible to decrease a used amount of the lower buffer material 31. Accordingly, it is possible to reduce a cost of the heat exchanger body 67.

In the heat exchanger 65 of the second embodiment configured as described above, it is possible to obtain effects similar to those of the heat exchanger 10 of the above-described first embodiment.

Figure 11:
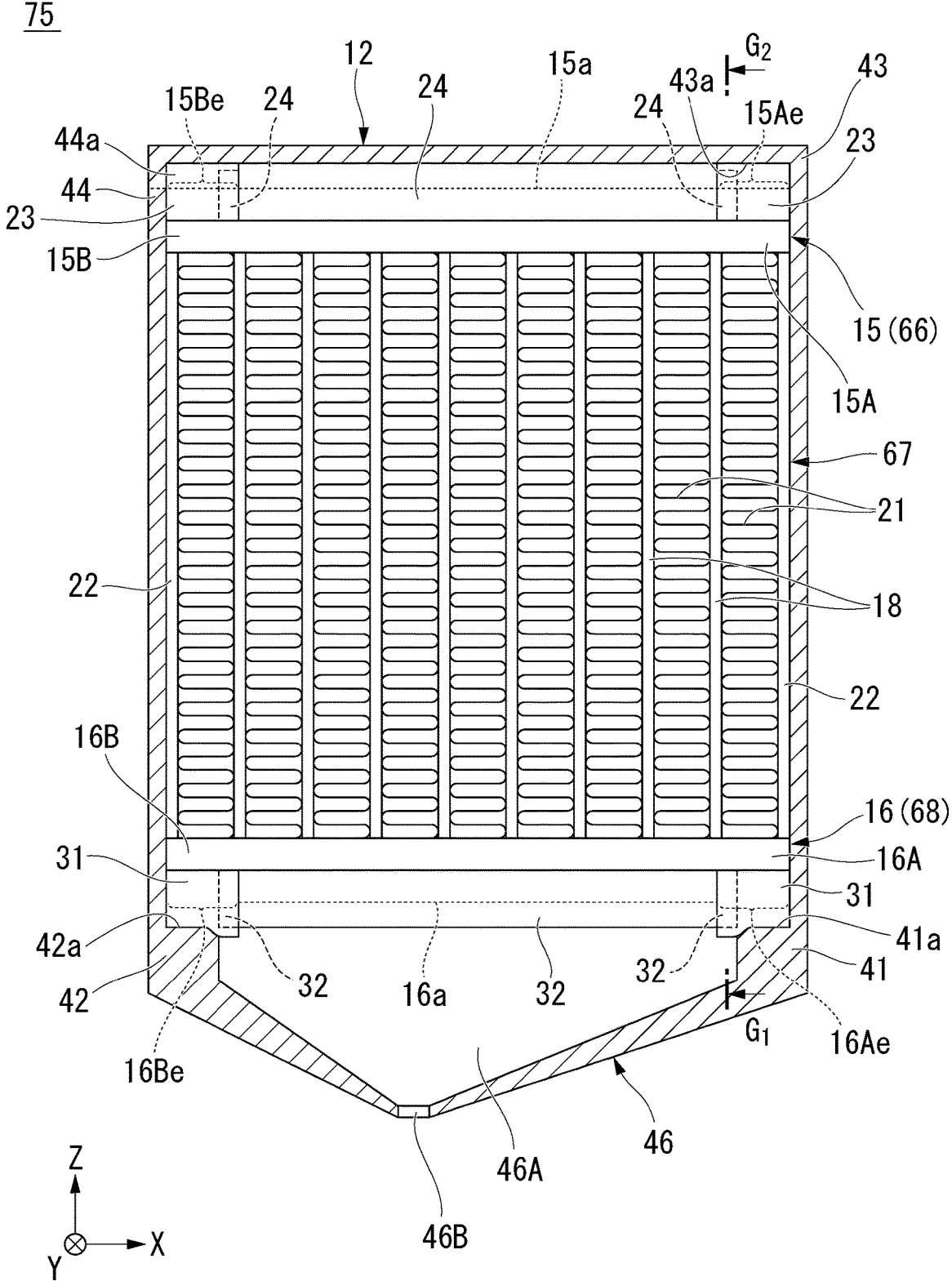
FIG. 11 is a front view schematically showing a heat exchanger according to a modified example of the second embodiment of the present invention.
Figure 12:
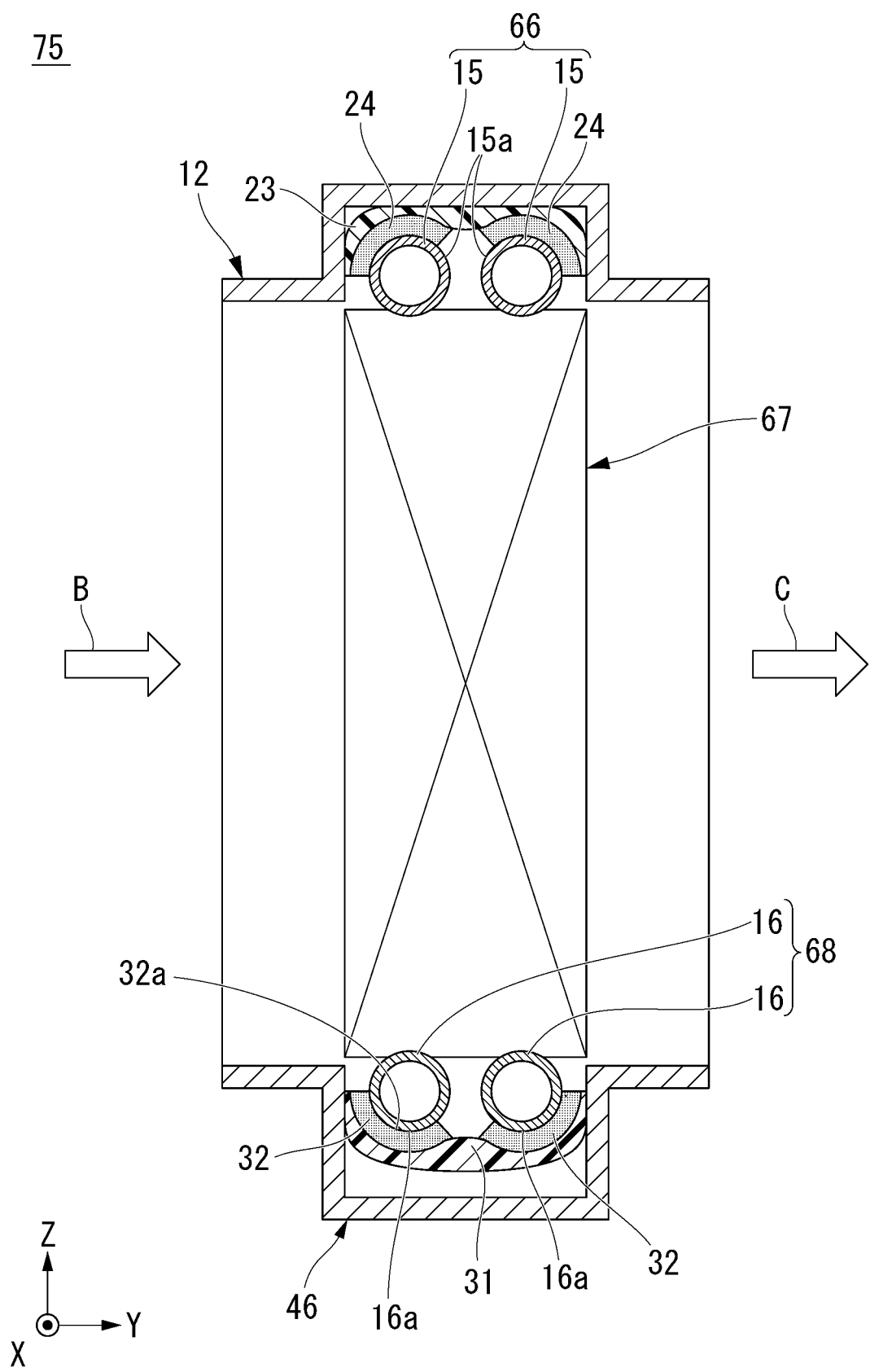
FIG. 12 is a sectional view taken along line $G_1$-$G_2$ in the heat exchanger shown in FIG. 11.

A heat exchanger 75 according to a modified example of the second embodiment will be described with reference to FIGS. 11 and 12.

The heat exchanger 75 according to the modified example of the second embodiment is configured similarly to the heat exchanger 60 of the third modified example of the first embodiment except that a portion of each of both end portions of the upper damping material 24 and the upper buffer material 23 are disposed to overlap each other.

In the heat exchanger 75 of the modified example of the second embodiment configured as described above, it is possible to obtain effects similar to those of the heat exchanger 60 of the third modified example of the first embodiment.

In addition, in the heat exchanger 75 according to the modified example of the second embodiment, the lower buffer material 31 may be disposed to collectively surround the entirety of the lower damping materials 32 provided in the pair of lower tubular members 16.

Third Embodiment

Figure 13:
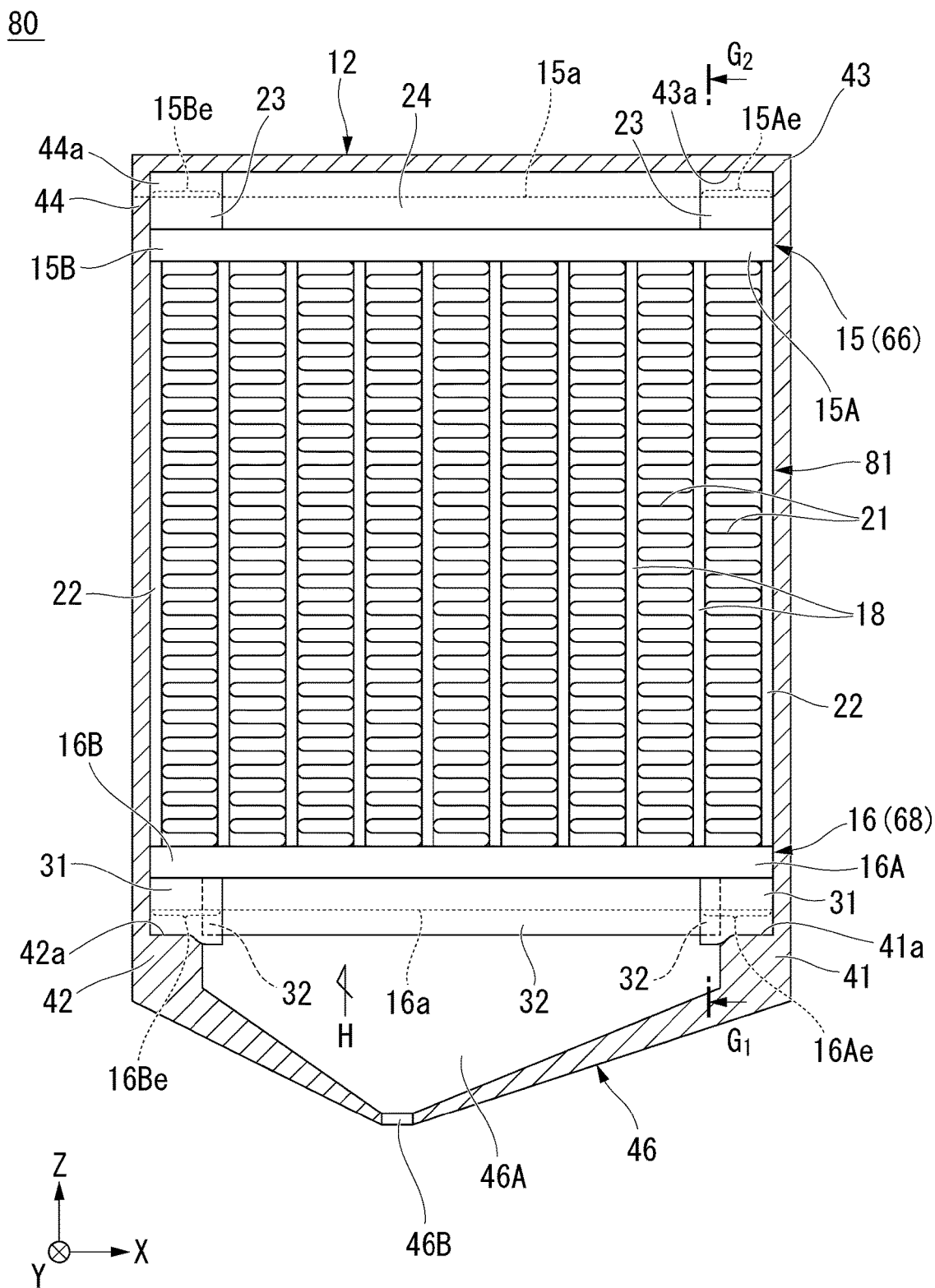
FIG. 13 is a front view schematically showing a heat exchanger according to a third embodiment of the present invention.
Figure 14:
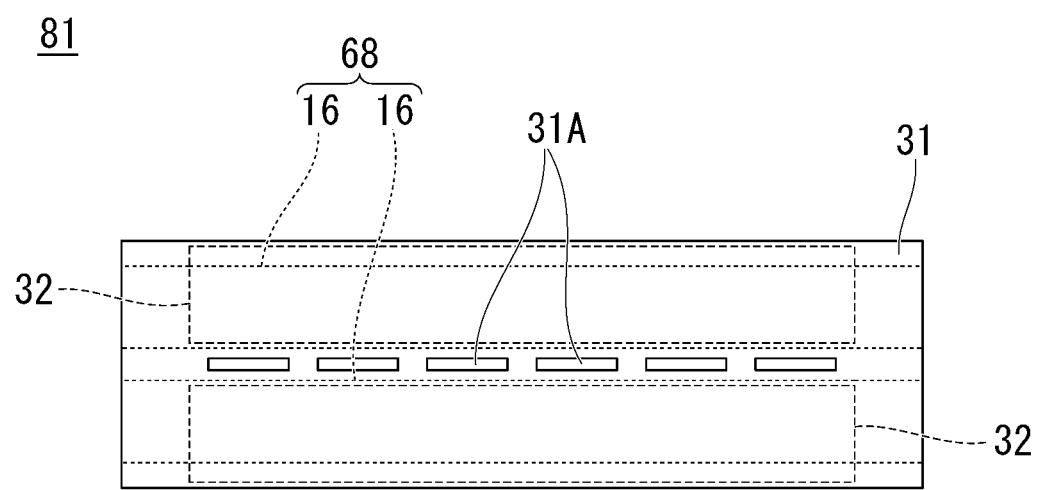
FIG. 14 is a view when a heat exchanger body in a state where a casing is removed from the heat exchanger shown in FIG. 13 is viewed from arrow H.
Figure 14:
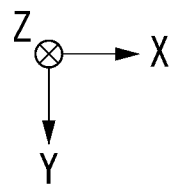

A heat exchanger 80 of a third embodiment will be described with reference to FIGS. 13 and 14. In FIG. 13, the same reference signs are assigned to the structure and the same portions shown in FIG. 8. In FIG. 14, the same reference signs are assigned to the structure and the same portions shown in FIG. 10.

The heat exchanger 80 is configured similarly to the heat exchanger 65 of the second embodiment except that a heat exchanger body 81 is provided instead of the heat exchanger body 67.

The heat exchanger body 81 is configured similarly to the heat exchanger body 67 except that the lower buffer material 31 is provided to collectively surround the entirety of the lower damping materials 32 provided in the pair of lower tubular members 16 and a plurality of through-portions 31A are provided in the lower buffer material 31 positioned between the lower tubular members 16.

The plurality of through-portions 31A function as a path for guiding the condensate water generated in the heat exchanger body 11 to the condensate water discharge space 46A.

According to the heat exchanger 80 of the third embodiment, the lower buffer material 31 is disposed to collectively surround the entirety of the lower damping materials 32 provided in the pair of lower tubular members 16, and thus, it is possible to support the lower damping material 32 provided between both end portions 16Ae and 16Be of the pair of lower tubular members 16. Accordingly, it is possible to further prevent the lower damping material 32 from being peeled off from the heat exchanger body 81 (the pair of lower tubular members 16).

Moreover, compared to a case where the lower buffer material 31 is disposed to surround each lower damping material 32 provided in the pair of lower tubular members 16, it is possible to decrease the amount of the lower buffer material 31. Accordingly, it is possible to reduce a cost of the heat exchanger body 81.

In addition, the plurality of through-portions 31A are provided in the lower buffer material 31 disposed between the pair of lower tubular members 16, and thus, it is possible to guide the condensate water generated in the heat exchanger body 81 to the condensate water discharge unit 46. Therefore, it is possible to prevent the condensate water from being collected in the lower end of the heat exchanger body 81.

In addition, in FIG. 14, for example, the case where the slit-shaped through-grooves are provided as the plurality of through-portions 31A is described. However, the plurality of through-portions 31A are not limited to this. For example, a plurality of through-holes may be used as the plurality of through-portions 31A. In addition, the plurality of through-portions 31A are not required to be provided, and one through-portion 31A may be provided.

Fourth Embodiment

Figure 15:
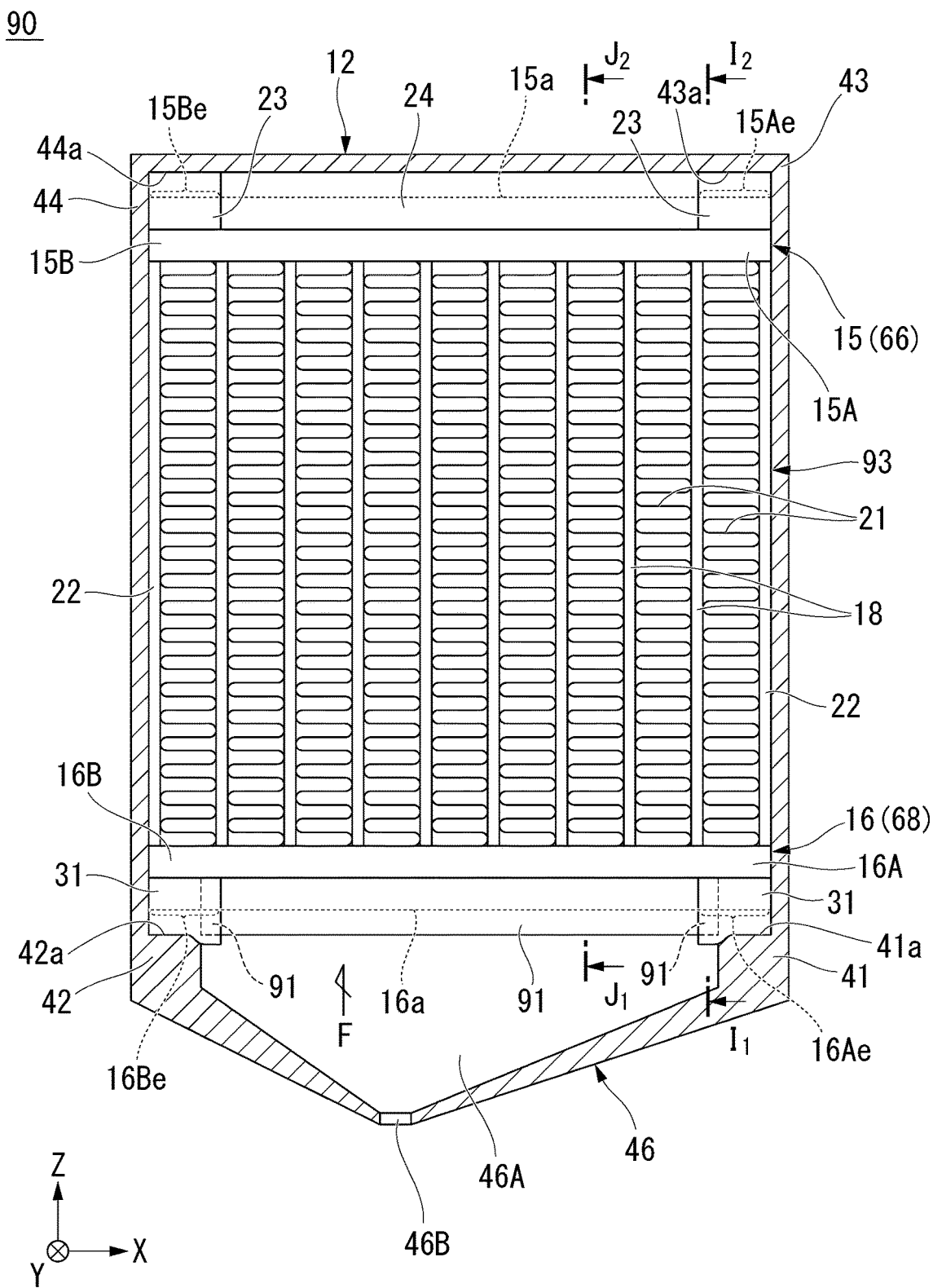
FIG. 15 is a front view schematically showing a heat exchanger according to a fourth embodiment of the present invention.
Figure 16:
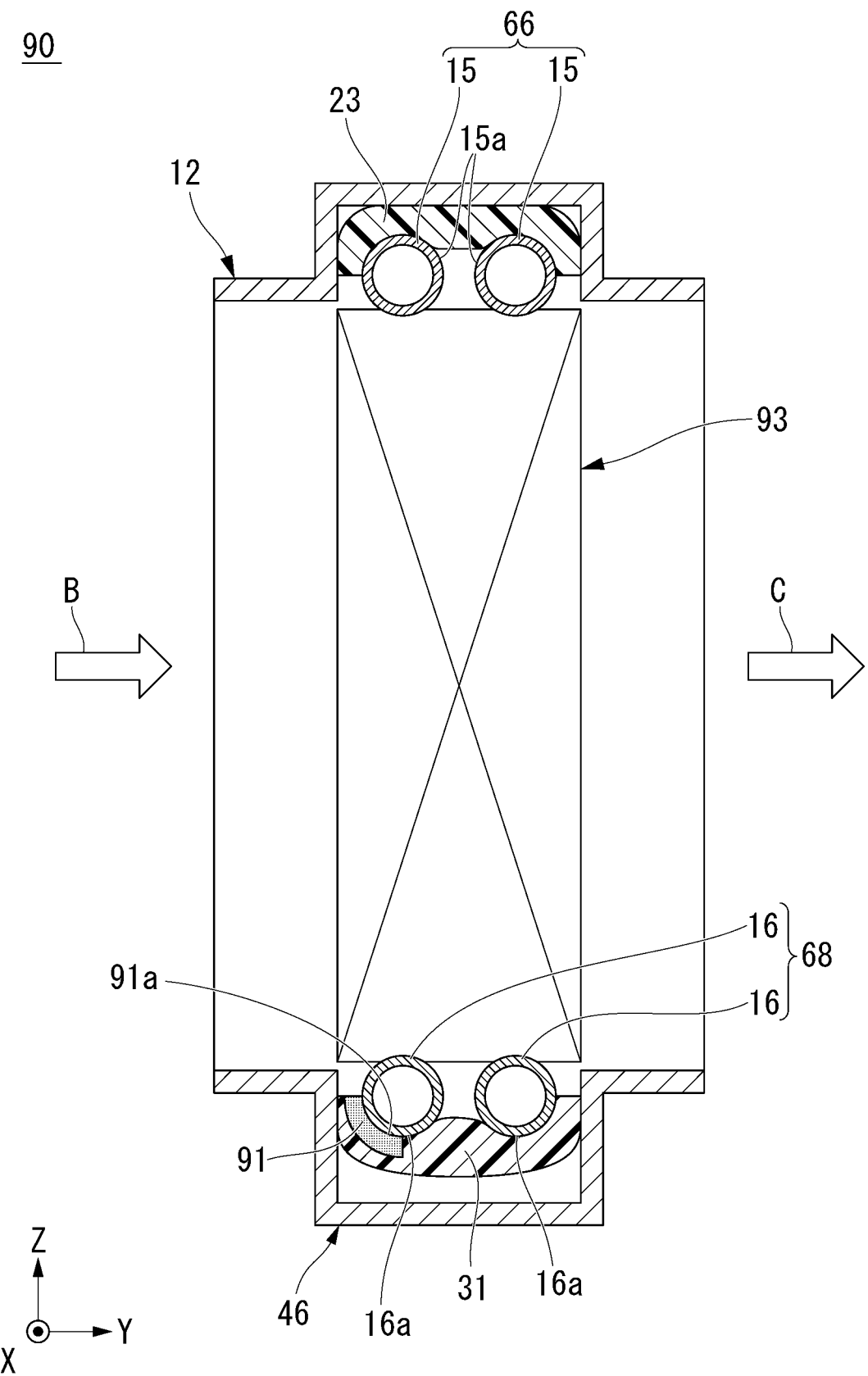
FIG. 16 is a sectional view taken along line $I_1$-$I_2$ in the heat exchanger shown in FIG. 15.
Figure 17:
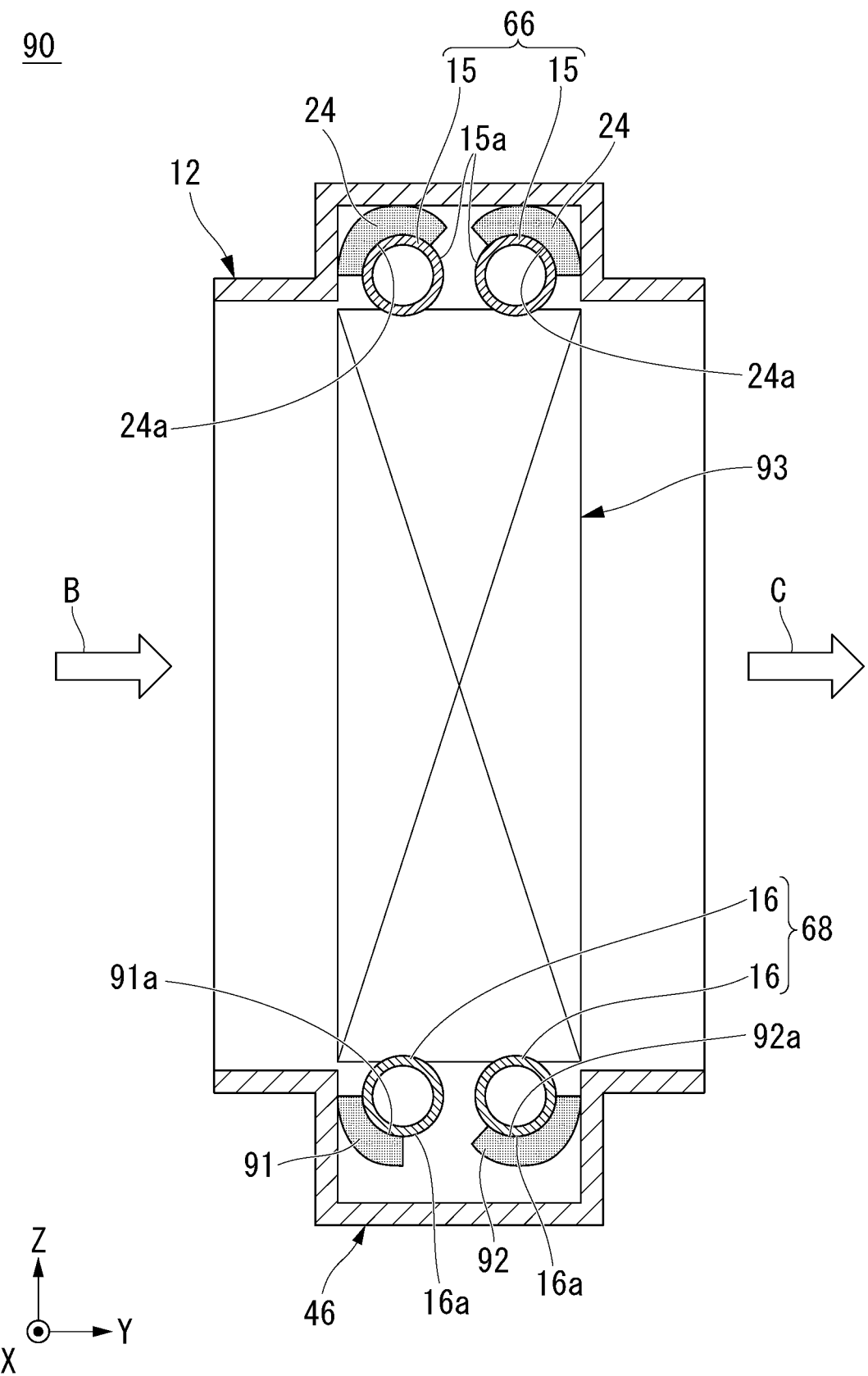
FIG. 17 is a sectional view taken along line $J_1$-$J_2$ in the heat exchanger shown in FIG. 15.

A heat exchanger 90 of a fourth embodiment will be described with reference to FIGS. 15 to 17. In FIGS. 15 to 17, the same reference signs are assigned to the structures and the same portions shown in FIGS. 8 to 10.

The heat exchanger 90 is configured similarly to the heat exchanger 65 of the second embodiment except that the heat exchanger body 93 is provided instead of the heat exchanger body 67.

The heat exchanger body 93 is configured similarly to the heat exchanger body 67 except that first and second lower damping materials 91 and 92 are provided instead of the lower damping material 32, and the lower buffer material 31 and a portion of each of both end portions of the first lower damping material 91 overlap each other.

The first lower damping material 91 is adhered to the outer peripheral surface 16*a* of one lower tubular member 16. The first lower damping material 91 has an adhesive surface 91*a* which is in contact with the outer peripheral surface 16*a* of one lower tubular member 16.

The second lower damping material 92 is adhered to the outer peripheral surface 16*a* of the other lower tubular member 16. The second lower damping material 92 has an adhesive surface 92*a* which is in contact with the outer peripheral surface 16*a* of the other lower tubular member 16.

An area of the adhesive surface 92*a* of the second lower damping material 92 is larger than an area of the adhesive surface 91*a* of the first lower damping material 91. The area of the adhesive surface 92*a* of the second lower damping material 92 is an area capable of obtaining a sufficient adhesive force to the other lower tubular member 16.

According to the heat exchanger 90 of the fourth embodiment, in a case where the area of the adhesive surface 91*a* of the first lower damping material 91 is smaller than the area of the adhesive surface 92*a* of the second lower damping material 92 and the adhesive force of the first lower damping material 91 with respect to one lower tubular member 16 is weak, the lower buffer materials 31 and only both end portions of the first lower damping material 91 overlap each other, and thus, it is possible to prevent the first lower damping material 91 from being peeled off.

In addition, in a case where the adhesive force of the second lower damping material 92 with respect to the other lower tubular member 16 is sufficiently strong, the lower buffer materials 31 and both end portions of the second lower damping materials 92 may not overlap each other.

In addition, the first upper damping material provided in one upper tubular member 15 and the second upper damping material provided in the other upper tubular member 15 are provided, the area of the adhesive surface of the first upper damping material is smaller than the area of the adhesive surface of the second upper damping material, and the adhesive force of the first upper damping material with respect to the one upper tubular member is weak, the upper buffer materials and only both end portions of the first upper damping material may overlap each other such that peeling off of the first upper damping material is prevented.

Hereinbefore, the preferred embodiments of the present invention are described in detail. However, the present invention is not limited to the specific embodiments, various modifications and changes can be made within a scope of the present invention as set forth in the appended claims.

Moreover, in the first to fourth embodiments, for example, the case where the heat exchanger bodies 11, 67, 81, and 93 are disposed to extend in the vertical direction (Z direction) is described. However, the heat exchanger bodies 11, 67, 81, and 93 may intersect the vertical direction and the upper headers 13 and 66 may be disposed to be positioned above the lower headers 14 and 68.

In addition, in the first to fourth embodiments, for example, each of the case where the upper damping material 24, the lower damping material 32, the first lower damping material 91, and the second lower damping material 92 has adhesion is described. For example, the present invention can be applied to a configuration in which the upper damping material and the lower damping material which does not have the adhesion is adhered to or bonded to the upper header or the lower header using an adhesive or a bonding agent.

INDUSTRIAL APPLICABILITY

The present invention can be applied to a heat exchanger.

REFERENCE SIGNS LIST 10, 50, 55, 60, 65, 75, 80, 90: heat exchanger
11, 67, 81, 93: heat exchanger body
11*a*: front surface
11*b*: rear surface
12: casing
13, 66: upper header
14, 68: lower header
15: upper tubular member
16: lower tubular member
15*a*, 16*a*: outer peripheral surface
15A, 16A: one end
15Ae, 15Be, 16Ae, 16Be: end portion
15B, 16B: the other end
17A: refrigerant inlet tube
17B: refrigerant outlet tube
18: tube
21: fin
22: side plate
23: upper buffer material
24: upper damping material
24*a*, 32*a*, 91*a*, 92*a*: adhesive surface
31: lower buffer material
31A: through-portion
32: lower damping material
41: first abutment portion
41*a* to 44*a*: abutment surface
42: second abutment portion
43: third abutment portion
44: fourth abutment portion
46: condensate water discharge unit
46A: condensate water discharge space
46B: discharge port
71: gap
91: first lower damping material
92: second lower damping material
B, C: direction

The invention claimed is:

1. A heat exchanger comprising:
a heat exchanger body which includes
a tubular upper header and a tubular lower header which are provided with a gap therebetween in an upward-downward direction,
a plurality of tubes which are arranged between the upper header and the lower header and are connected to the upper header and the lower header, and through which a refrigerant flows,
fins which are provided between the tubes provided at positions adjacent to each other,
a pair of lower buffer materials, each lower buffer material covering one end of a lower outer peripheral surface of the lower header, and
an adhesive lower damping material which is provided on the lower outer peripheral surface of the lower header and is formed such that each of both end portions of the lower damping material is extended between the lower header and the lower buffer material; and
a casing which includes a first abutment portion against which one of the lower buffer materials provided in both end portions of the lower header abuts, a second abutment portion against which the other thereof abuts, and a condensate water discharger which is provided below the first and second abutment portions, wherein the condensate water discharger, the first and second abutment portions, and the lower damping material define a condensate water discharge space, and the casing includes a discharge port through which condensate water is discharged to an outside from the condensate water discharge space.

2. The heat exchanger according to claim 1, wherein the lower header includes a pair of lower tubular members which is disposed to be adjacent to each other and extends in the same direction, wherein the lower damping material is provided in each of the pair of lower tubular members, and wherein each of the lower buffer material is disposed to collectively surround the lower damping materials provided in each of both end portions of the pair of lower tubular members.

3. The heat exchanger according to claim 1, wherein the lower header includes a pair of lower tubular members which is disposed to be adjacent to each other and extends in the same direction, wherein the lower damping material is provided in each of the pair of lower tubular members, wherein the lower buffer material is disposed to collectively surround an entirety of the lower damping materials provided in the pair of lower tubular members, and wherein a through-portion is provided in the lower buffer material disposed between the pair of lower tubular members.

4. The heat exchanger according to claim 1, wherein the lower header includes a pair of lower tubular members which is disposed to be adjacent to each other and extends in the same direction, wherein the lower damping material includes a first adhesive lower damping material which is provided in one lower tubular member of the pair of lower tubular members and a second adhesive lower damping material which is provided in the other lower tubular member of the pair of lower tubular members, and wherein in a case where an area of an adhesive surface of the first lower damping material being in contact with one lower tubular member is smaller than an area of an adhesive surface of the second lower damping material being in contact with the other lower tubular member, the lower buffer material and only both end portions of the first lower damping material overlap each other.

5. The heat exchanger according to claim 1, wherein the heat exchanger body includes an upper buffer material which is provided to cover an upper outer peripheral surface of each of both end portions of the upper header, and an adhesive upper damping material which is provided on the upper outer peripheral surface of the upper header exposed from the upper buffer material provided in each of both end portions of the upper header and is formed such that at least a portion of each of both end portions extends between the upper header and the upper buffer material, and wherein the casing includes a third abutment portion against which one of the upper buffer materials provided in both end portions of the upper header abuts and a fourth abutment portion against which the other thereof abuts.

6. The heat exchanger according to claim 5, wherein the upper header includes a pair of upper tubular members which is disposed to be adjacent to each other and extends in the same direction, wherein the upper damping material is provided in a portion of each of both end portions of at least the pair of upper tubular members, and wherein the upper buffer material is disposed to collectively surround the upper damping materials provided in each of both end portions of the pair of upper tubular members.

7. The heat exchanger according to claim 5, wherein the upper header includes a pair of upper tubular members which is disposed to be adjacent to each other and extends in the same direction, wherein the upper damping material is provided in a portion of each of both end portions of at least the pair of upper tubular members, and wherein the upper buffer material is disposed to collectively surround an entirety of the upper damping materials provided in the pair of upper tubular members.

8. The heat exchanger according to claim 1, wherein the condensate water discharger further including a condensate water collection pan, wherein the condensate water discharge space is formed between the lower header and the condensate water collection pan, and the discharge port is formed in the condensate water collection pan.

* * * * *